UNITED STATES PATENT OFFICE.

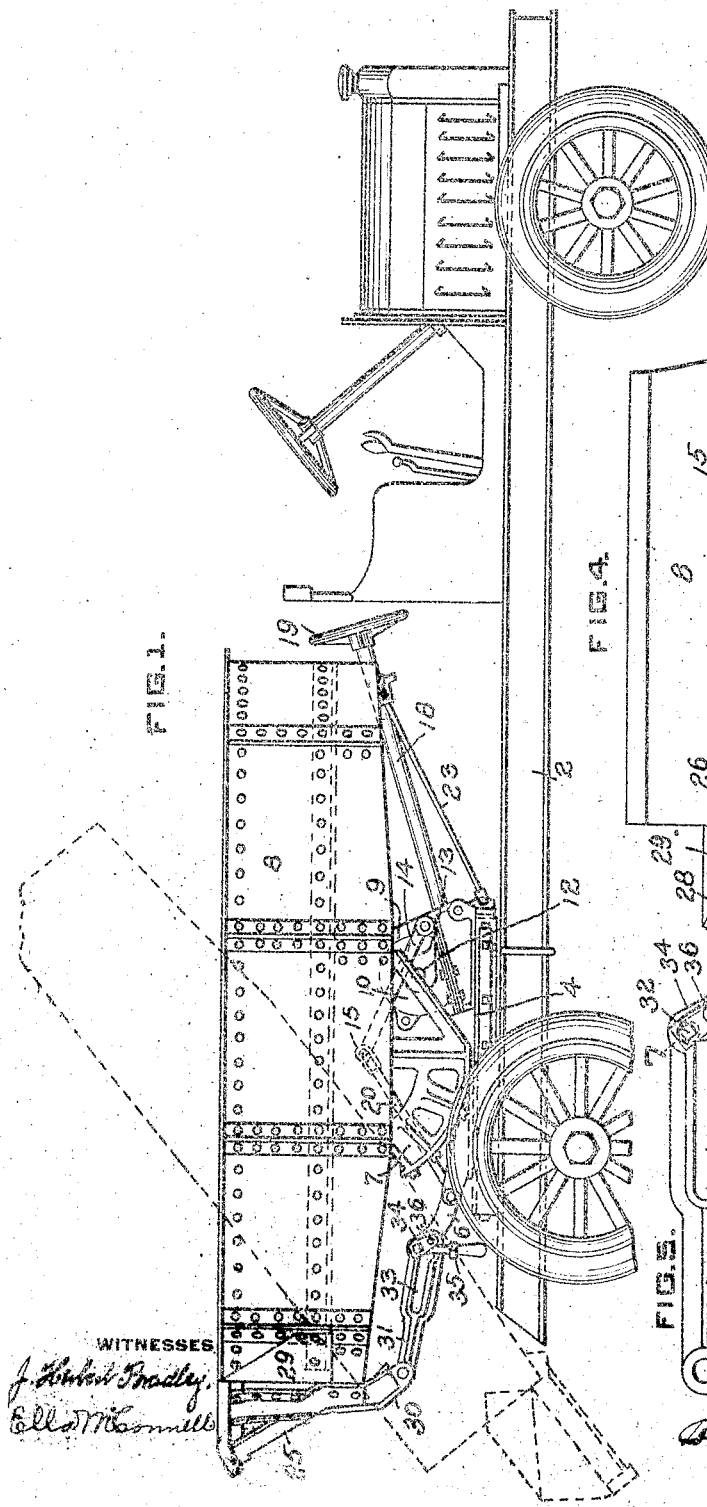
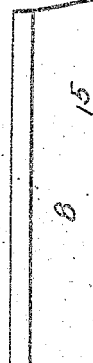
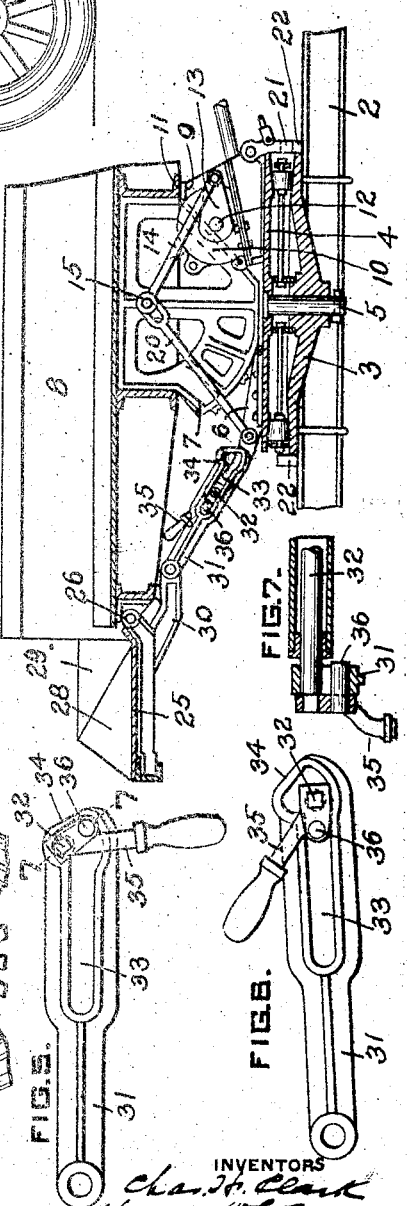

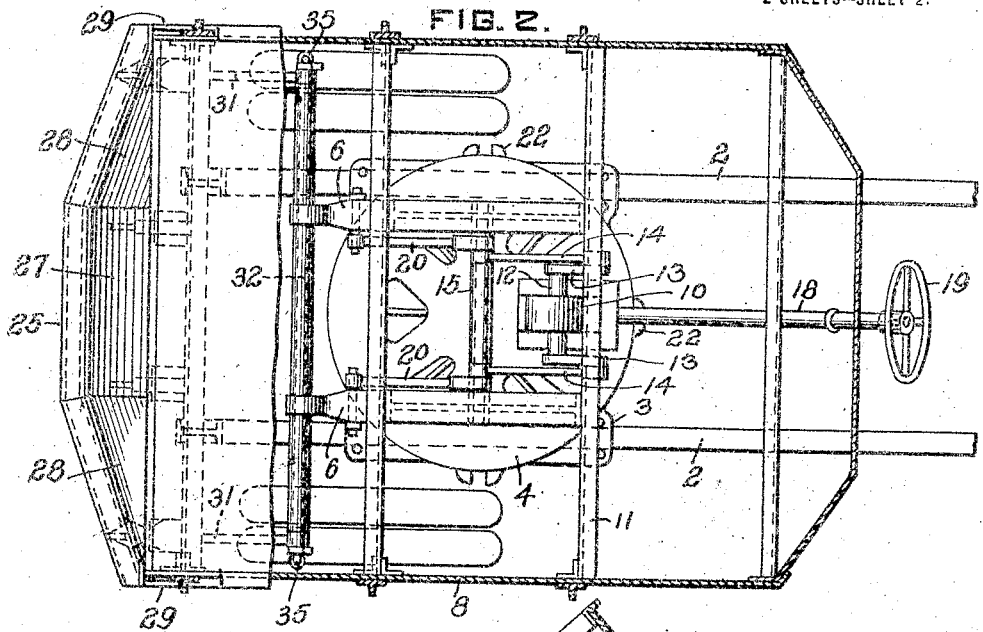
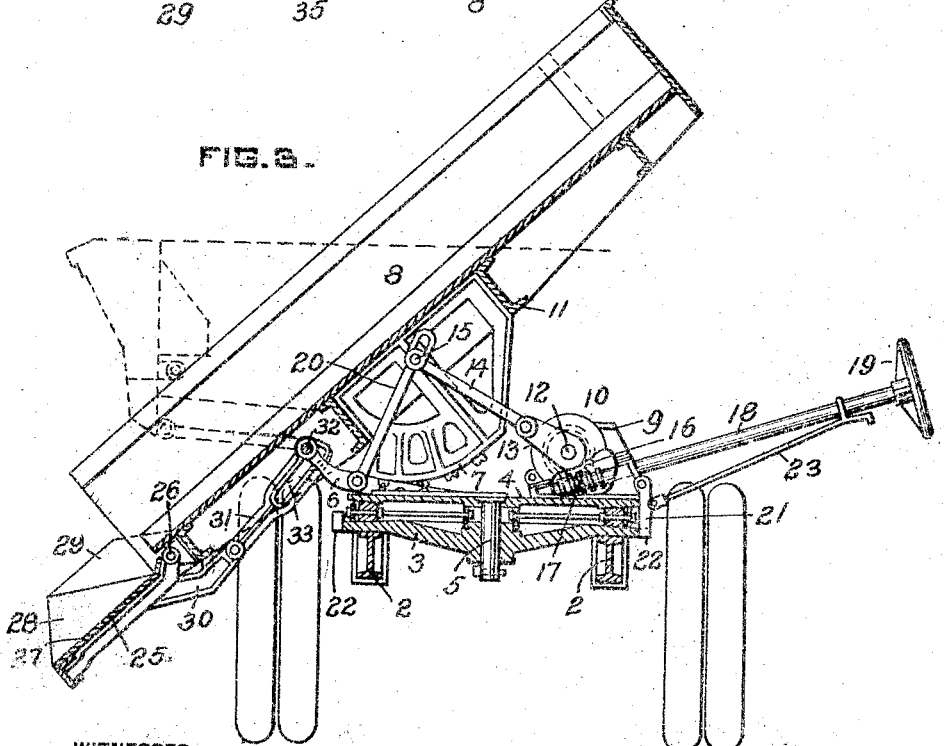

CHARLES H. CLARK, OF CRAFTON, AND HOWARD L. BEACH. OF EDGEWOOD, PENNSYLVANIA.

DUMP-TRUCK.

1,220,728.  Specification of Letters Patent.  Patented Mar. 27, 1917.

Application filed January 6, 1916. Serial No. 70,601.

*To all whom it may concern:*

Be it known that we, CHARLES H. CLARK and HOWARD L. BEACH, citizens of the United States, and residents of Crafton and Edgewood, respectively, in the county of Allegheny and State of Pennsylvania, have invented certain new and useful Improvements in Dump-Trucks, of which the following is a specification.

This is in part a continuation of our application filed February 27, 1915, Serial No. 10934, for dump trucks, and relates primarily to an efficient end gate of improved construction for heavy service trucks, particularly trucks of automobile type for hauling coal, sand, gravel and other heavy commodities in bulk. The end gate and its operating mechanism are so arranged that the gate is automatically opened by the dumping movement of the truck body and is automatically closed by the righting movement. The invention also includes improved means for opening the end gate independently of the movements of the body for non-dumping loading and unloading, and also whereby timbers, rails, beams, etc., longer than the body may be conveniently loaded and hauled.

In the accompanying drawings, Figure 1 is a side elevation of a truck embodying the invention, the body being shown in normal position in full lines and in dumping position in dotted lines. Fig. 2 is a top plan of the truck with the body shown in the normal or full line position of Fig. 1, and with portions of the body floor broken away to disclose the operating mechanism located therebeneath. Fig. 3 is a longitudinal section of the body and its mounting, illustrating the position thereof when the body is dumping at one side of the truck or at right angles to the position shown in Fig. 1. Fig. 4 is a longitudinal sectional view of the end gate mechanism and a portion of the body, the latter being shown in upright position and the end gate opened. Figs. 5 and 6 are detail views of the devices whereby the end gate may be caused to open simultaneously with dumping the body or independently thereof, as desired. Fig. 7 is a section of the mechanism taken on line 7—7 of Fig. 5.

While the end gate mechanism of the present invention may be applied to various types of dumping vehicles, it is here shown embodied in an automobile truck, the body of which is rotatable on the chassis for dumping at the rear or at either side and with the end gate operative in each of the several dumping positions to which the body may be moved.

Referring to the drawings, the chassis is of conventional form and embodies the longitudinal girders 2 which support the fixed base 3 upon which turn-table 4 is adapted to rotate about vertical post 5. Secured to the upper side of table 4 are the parallel rocker trackways 6, and adapted to roll thereon are the cogged rockers 7 secured to the under side of vehicle body 8.

When the body is in upright position, as in Fig. 1, the rockers 7 comprise upright parallel supports which are in line with each other transversely of the body, while a third and forwardly positioned support is provided by lug 9 projecting from gear casing 10, floor sill 11 of the body being adapted to rest on lug 9 when the body is in normal horizontal position.

The body dumping gear may be variously arranged. In the embodiment here shown, the body actuating mechanism is mounted on turn-table 4 and includes the gear casing 10 in which is journaled shaft 12 having cranks 13 which are connected by links 14 with rod 15, the latter secured to rockers 7. A gear wheel 16 is secured to shaft 12 within casing 10 and meshes with worm 17 on operating shaft 18, the latter journaled in casing 10 and extending forwardly beyond the front end of body 8 and carrying handwheel 19. When the body is in normal position, as in Fig. 1, the worm gearing locks it against backward or tilting movement, while abnormal forwardly tilting movement, such as might result from loading the body too heavily at its front end, is precluded by links 20 which at one end are secured to trackways 6 and at their opposite ends slotted to embrace rod 15 to afford movement necessary for the dumping operation.

A gravity latch 21 is adapted to engage lugs 22 at the front and at either side of table base 3 for locking the turn-table and body when turned to position for dumping at the rear or at either side of the truck. Latch 21 may be released by rod 23 which extends forward along shaft 18 within easy reach of hand wheel 19. Even with the body fully loaded it may be readily rotated by means of the turn-table, the operator simply releasing the latch and pushing or pulling the body around to the position at which it is desired to dump the load.

The end gate 25 is mounted to turn outwardly and downwardly on hinges 26, the latter preferably mounted at the rear end of the body beneath the floor thereof as shown. The gate is of chute-like form, the same when closed being inclined upwardly and outwardly from its lower edge, and comprising a central panel-like portion 27 and two diagonally disposed sloping panel-like side portions 28. With the gate-forming panels arranged as shown, a chute is provided for directing the discharging lading when the gate is open, the material flowing out over the central panel 27, being deflected toward the same by the sloping side panels 28. With central panel 27 outwardly inclined when the gate is closed, movement through materially less than ninety degrees suffices to place the gate in full open position, as shown in dotted lines in Fig. 1. Wings 29 project from the side panels 28 and overlap the body sides when the gate is closed, and when open prevent the lading from overflowing the ends of the gate. With the end gate constructed as shown it operates to contract the lading into a relatively narrow stream for discharging into a coal hole or other circumscribed space.

For automatically opening and closing the end gate in any and all positions of the body, whether at the rear or at either side, arms 30 depending from the gate beneath hinges 26 are connected by links 31 to a non-dumping portion of the structure, preferably to the upwardly disposed extremities of trackways 6, said links having pivotal movement about shaft 32 supported by the trackways. The downwardly tilting movement of the body so increases the distance between hinges 26 and rod 32 that the gate is swung outwardly and downwardly as in Fig. 3 into the chute-forming position above described, and is positively held in that position as long as the body remains tilted. The righting movement of the body results in automatically restoring the gate to closed position in which it is securely held by links 31 so long as the body remains upright.

Links 31 are longitudinally slotted at 33, with an offset 34 at one end of the slot for embracing rod 32 for effecting the above described positive movement, the slotted link of said rod being maintained in this relation by a lever 35 which is mounted on rod 32, the lever having a projection 36 which moves in the enlarged end of slot 33 in such manner as to lock the slot enlargement 34 in embracing engagement with the rod, so that with the lever 35 turned to the position shown in Figs. 1 and 3 link 33 is prevented from moving longitudinally on rod 32 and hence the end gate is caused to open with the dumping movement of the body and to close with its righting movement as above described. When, however, it is desired to open the end gate with the body in upright position, as in Fig. 4, it is only necessary to turn lever 35 to position parallel with link 31, thereby unlocking the slot offset 34 from its embracing engagement with shaft 32 and permitting link 31 to slide over the shaft as in Fig. 4 so that the end gate may be turned down to open position, access may be had to the body for non-dumping loading and unloading and whereby articles of considerable length may be hauled, portions thereof projecting outwardly over the end gate as will be understood.

Although its facility for dumping at the rear or at either side renders the truck peculiarly well adapted for coal haulage, it will be understood that other materials in bulk capable of dumping may be transported with equal facility, in addition to relatively long articles which are adapted to be loaded with the gate open or in lowered position. There is ample clearance for dumping at either side without interfering with the ground wheels, and when the body is fully inclined the chute-forming end gate is relatively close to the ground or pavement, and at the same time is spaced well outwardly from the ground wheels so that the load is discharged clear of the running gear with little or no tendency to flow back beneath the truck, an objection commonly experienced with dumping vehicles.

We claim:

1. In a dump truck, the combination of a frame, a body mounted to tilt on the frame, a downwardly and outwardly opening gate hinged to the body, links pivotally connected to the gate and also pivotally connected to the frame for automatically opening and closing and locking the gate upon dumping and righting the body, the links slotted for longitudinal movement relatively to the frame, and manually-adjustable movable means adapted in one position to afford the links only pivotal movement relatively to the frame and in another position adapted to afford them sliding movement relatively thereto.

2. A dump truck comprising a frame, a tilting body carried thereby, an end gate for said body, a gate swinging and locking link at one end pivotally joined to said gate to automatically swing and lock the same, said link at its opposite end pivotally mounted on a fixed portion of said frame and having a longitudinal slot with an offset, and a manually operated locking lever adapted to lock said link against longitudinal movement with said portion in said offset, and adapted to unlock said link to permit longitudinal movement thereof, with said portion in said slot, substantially as described.

3. A dump truck comprising a frame, a body mounted to tilt on the frame, means for tilting the body, a discharge-chute-forming end gate for the body, said gate being hinged at its lower portion to said body to swing outwardly and downwardly when opening, said gate when closed having its central portion inclined upwardly and outwardly from its lower edge, said gate composed of an inclined central portion and two diagonally disposed sloping side portions having laterally projecting side wings lapping the side walls of the body when the gate is closed, and gate actuating and locking means secured to the gate and to the frame for automatically opening and closing the gate as the body moves toward and from dumping position.

4. In combination, in a dump truck, a frame, a dumping body provided with operating means, an end gate for said body at its lower end hinged to the bottom portion of said body to swing downwardly and outwardly when opening, said gate when closed fitting the sides and floor of said body and at its central portion inclined from its lower edge upwardly and outwardly to its upper edge to increase the internal capacity of said body and when in opened position to form a discharge chute for, and projecting in approximate continuation of, said body, and means for opening, closing, and locking said gate, substantially as described.

5. In combination, a frame, a tilting dumping body, a downwardly and outwardly opening gate hinged to the body and provided with an arm rigid therewith and a gate locking and operating link connection at one end pivoted to said arm and at the opposite end directly pivoted to said frame to rock on a fixed axis on said frame as the body swings to and from dumping position and to thereby swing said gate to and from open position, and held against normal longitudinal movement to hold said gate locked in closed position when said body is in elevated position.

6. In combination, a frame, tracks having rear ends, a tilting body having rockers traveling on said tracks as the body moves to and from dumping position, a downwardly and outwardly opening end gate at its lower portion hinged to said body and provided with rigid arms, and gate operating and locking connections between said arms and said track ends and swingable on a fixed axis carried by said ends to open and close said gate as the body moves to and from dumping position and to lock the gate in closed position when the body is in upright position.

7. In combination, a frame having a fixed axis, a tilting dumping body, an outwardly and downwardly swingable gate for and at its lower portion hinged at the bottom portion of the body, said gate provided with a rigid depending arm, and a gate opening and closing and locking link at one end mounted and swingable on said fixed axis and at the other end pivoted to said arm, whereby said axis remains in a fixed position during the dumping and return movements of the body and the link thereby automatically opens and closes the gate during said movements and holds the gate locked in closed position when the body is upright.

8. In combination, in a dump truck, a frame, a tilting dumping body, means for normally maintaining said body in upright position against tilting, a downwardly and outwardly opening gate for said body, and gate operating and locking link connections forming no part of said means and arranged between the gate and frame and normally held in operative position against relative longitudinal movement to old the gate locked in closed position when the body is upright and to automatically swing the gate to open position and to closed position as the body tilts to and from dumping position, said connections embodying manually-operated means for releasing said connections from said operative position and to permit relative longitudinal movement thereof and thereby permit opening swing of the gate when the body is upright.

In testimony whereof we affix our signatures in presence of two witnesses.

CHARLES H. CLARK.
HOWARD L. BEACH.

Witnesses:
 SUE B. FRITZ,
 M. S. STAVER.